Figure 1:
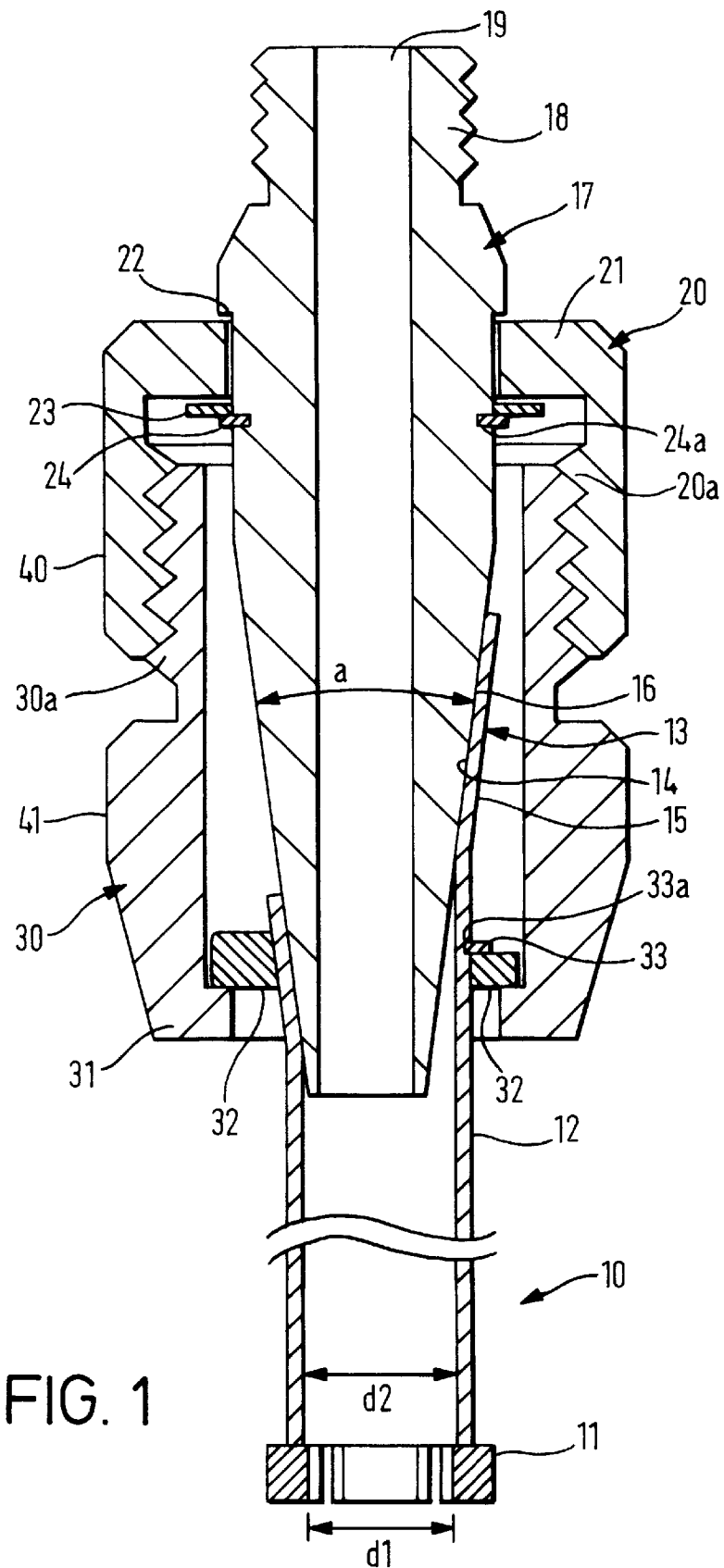

United States Patent [19]
Skinner

[11] Patent Number: 5,807,038
[45] Date of Patent: Sep. 15, 1998

[54] DRILL CHUCK

[75] Inventor: Keith Thomas Skinner, Coventry, England

[73] Assignee: Xcalibre Equipment Ltd., Coventry, England

[21] Appl. No.: 743,402

[22] Filed: Nov. 1, 1996

[30] Foreign Application Priority Data

Nov. 4, 1995 [GB] United Kingdom .................. 9522651

[51] Int. Cl.⁶ .............................. B23B 31/11; B23B 51/04
[52] U.S. Cl. .............................. 408/204; 279/8; 279/101; 279/103; 408/226; 408/239 R
[58] Field of Search .................................. 408/204, 206, 408/207, 203.5, 209, 226, 238, 239 R; 279/8, 32, 99, 101, 102, 103

[56] References Cited

U.S. PATENT DOCUMENTS

| 484,075 | 10/1892 | Wilkie ........................................ 144/23 |
| 1,784,589 | 12/1930 | Greenberg .................................... 279/8 |
| 4,657,445 | 4/1987 | Bossler . | |
| 4,929,131 | 5/1990 | Allemann .................................... 279/8 |

FOREIGN PATENT DOCUMENTS

| 3446296 | 6/1986 | Germany .............................. 408/145 |
| 188617 | 8/1987 | Japan ........................................... 279/8 |
| 499300 | 1/1939 | United Kingdom ................... 408/204 |
| 2 263 489A | 7/1993 | United Kingdom . |

*Primary Examiner*—Daniel W. Howell
*Attorney, Agent, or Firm*—Barnes & Thornburg

[57] ABSTRACT

A drill chuck for holding a tapered end of a tubular drill bit. The chuck comprises a driving member having a tapered surface for frictional engagement with the tapered end of the drill bit, a first holding member mounted on the driving member and a second holding member mounted, in use, on the tubular drill bit. The second member has a substantially radial surface thereon for abutment with a surface 31 on the drill bit. The two holding members can be screwed together whereby abutment between the substantially radial surface on the second holding member and the surface on the drill bit urges the tapered end of the tubular drill bit into frictional driving contact with the tapered surface of the driving member.

20 Claims, 3 Drawing Sheets

DRILL CHUCK

The invention relates to a drill chuck and is particularly, but not exclusively, concerned with a drill chuck for coupling a drive member to a taper ended drill bit.

In our UK Patent No 2263489, a hollow taper ended tubular drill bit is secured for rotation by gripping internal and external tapered surfaces of the drill bit between respective external and internal tapers on a driving member and a holding member in the form of a sleeve. In order to remove the drill bit from the driving member, the holding member is unscrewed. However, the unscrewing of the holding member involves overcoming the frictional grip between the internal taper on the holding member and the external taper on the drill bit. The forces involved require the use of a tool to overcome the frictional forces and the same tool is required to tighten the holding member afterwards when refitting the tool.

The drill bit described in UK Patent No. 2263489 can be used for drilling into a concrete surface to form a bore therein or for generating a core sample from the ground. Once a drilling operation has been performed, the drilled-out material or core sample is removed from the drill bit after detaching the drill bit. Obviously, where a large number of holes is to be drilled, the detachment and re-attachment of the drill bit increases production time particularly as tools are required to release and re-tighten the holding member. An object of the present invention is to provide a chuck which enables such a drill bit to be detached and re-attached quickly and easily.

According to one aspect of the invention there is provided a drill chuck for holding a tapered end of a tubular drill bit, the chuck comprising a driving member having a tapered surface for frictional engagement with the tapered end of the drill bit, a first holding member mounted on the driving member and a second holding member engageable with the tubular drill bit, the second holding member having a substantially radial surface thereon for abutment with a surface on the drill bit the two holding members being interconnectable by relative rotary movement whereby abutment between the substantially radial surface on the second holding member and the surface on the drill bit urges the tapered end of the tubular drill bit into frictional engagement with the tapered surface of the driving member.

With such an arrangement, the use of the substantially radial surface means that it is not necessary to overcome friction between two tapered surfaces when rotating the second holding member making it much easier and quicker to change the drill bit. Moreover, the use of the first and second holding members is particularly advantageous in that, instead of using a tool, the user can grasp both holding members one in each hand and twist them in opposite directions for removal of the drill bit and when tightening the drill bit for use.

In the preferred embodiment, the first holding member is rotatably mounted on the driving member and the second holding member may be rotatably mounted, in use, on the tubular drill bit.

Preferably, one of the first holding member and driving member has a projection thereon for abutment with a surface on the other so that the drill bit and driving member will be drawn towards each other by interconnection of the two holding members. In the preferred embodiment, the projection is provided on the first holding member and may take the form of an annular flange.

The projection may locate in a space between two surfaces on the driving member whereby the first holding member is held captive on the driving member.

Preferably, the substantially radial surface on the second holding member is annular and the surface on the drill bit may also be annular.

In the preferred embodiment, the first holding member and/or the second holding member comprise/comprises a sleeve.

The first and second holding members may be interconnected by means of a screw thread so that the drill bit is drawn against the driving member by a relative rotary movement between the two holding members. The first holding member may be formed with an internal screw thread in such a case.

The drill bit may be provided with an abutment surface against which a surface portion of the second holding member can be driven during disconnection of the two holding members so as to separate the tapered surface of the drill bit from the tapered surface of the driving member.

According to a second aspect of the invention there is provided a drill chuck for holding a tapered end of a tubular drill bit, the chuck comprising a driving member having a tapered surface for frictional engagement with the tapered end of the drill bit and holding means for the drill bit, the holding means being movable into a holding position in which it holds the tapered end of the drill bit in frictional engagement with the tapered driving surface of the driving member and into a release position in which it separates the tapered end of the drill bit from the tapered surface of the driving member to enable the drill bit to be removed from the chuck.

The holding means may be held captive on the drill bit in use.

The holding means may comprise first and second holding members as aforesaid and, in such a case, the second holding member may be held captive on the drill bit. Where the second holding member has the aforesaid substantially radial surface thereon, means defining that surface may be held captive between spaced apart surfaces on the drill bit. One of the said surfaces on the drill bit may be the surface which co-operates with the second holding member to enable the drill bit to be drawn towards the driving member and the other surface may be the said abutment surface against which the surface portion of the second holding member can be driven during disconnection of the two holding members so as to separate the tapered surface of the drill bit from the tapered surface of the driving member.

The first holding member may have an external surface formed with a contour produced, for example, by knurling to facilitate manual gripping of the first holding member. The second holding member may have an external surface which is similarly formed.

According to a third aspect of the invention there is provided a drill chuck for holding a tapered end of a tubular drill bit, the chuck comprising a driving member having a tapered surface for frictional engagement with the tapered end of the drill bit, a first holding member mounted on the driving member and a second holding member engageable with the tubular drill bit, the two holding members being interconnectable by relative movement, preferably rotary movement, so as to urge the tapered end of the tubular drill bit into frictional engagement with the tapered surface of the driving member.

According to a fourth aspect of the invention there is provided a drill chuck for holding a tapered end of a tubular drill bit, the chuck comprising a driving member having a tapered surface for frictional engagement with the tapered end of the tubular drill bit, a holding member mounted on the driving member having a substantially radial surface thereon for abutment with a surface on the drill bit whereby abutment between the substantially radial surface on the holding member and the surface on the drill bit urges the tapered end of the tubular drill bit into frictional driving contact with the tapered surface of the driving member. Preferably a first holding member is provided on the driving member and the aforesaid holding member having the substantially radial surface is a second holding member attachable by rotary movement to the first holding member.

Other features as set out in any of the consistory clauses relating to the first or second aspect of the invention may apply to the third or fourth aspects of the invention.

Figure 2:
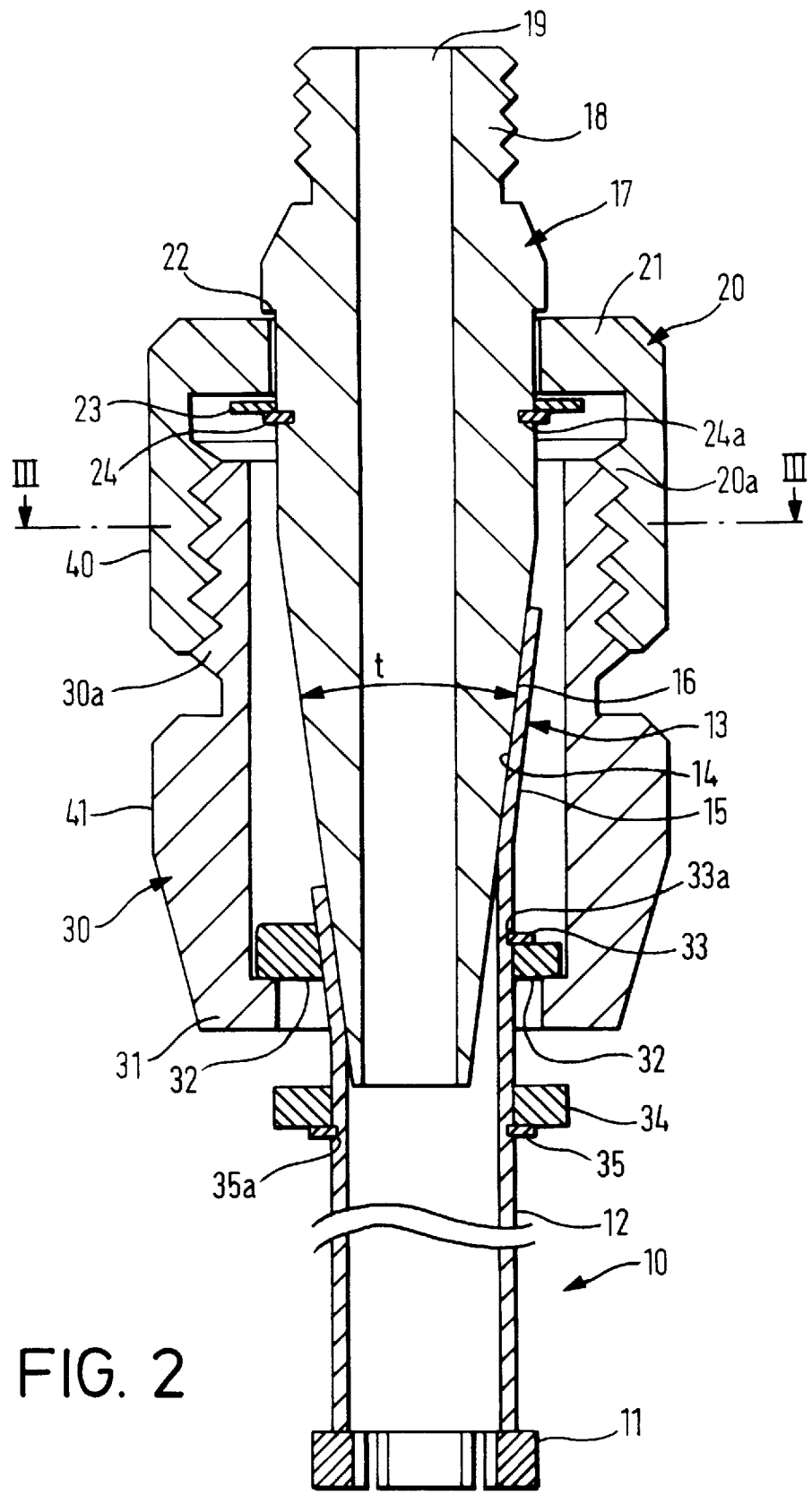
Figure 3:
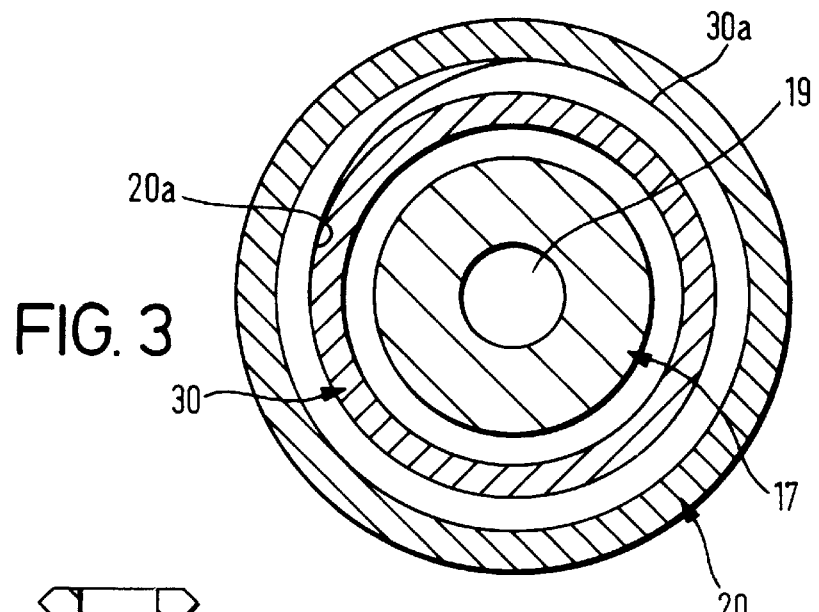
Figure 4:
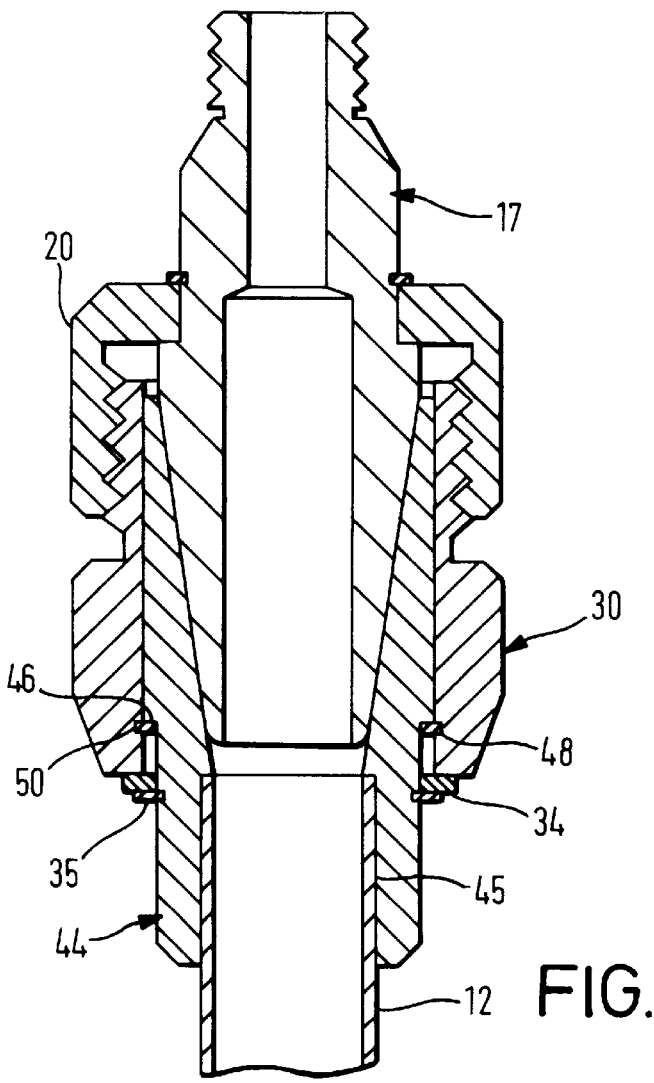

A drill chuck in accordance with the invention will now be described by way of example with reference to the accompanying drawings in which:

FIG. 1 is a vertical cross section through a first example of a drill chuck in accordance with the invention, the portion of the drawing to the right of the centreline illustrating installation of a drill bit of a first diameter in the drill chuck, and the portion of the drawing to the left of the centreline illustrating installation of a drill bit of a second diameter smaller than the first diameter in the drill chuck, FIG. 2 is a vertical cross section similar to FIG. 1 through a second example of a drill chuck in accordance with the invention, FIG. 3 is a cross section of the drill chuck in FIG. 2 on line III—III in FIG. 2 and FIG. 4 is a cross section through a chuck in accordance with the invention showing a modification to the drill bit.

Referring firstly to FIG. 1, a drill bit 10 comprises a steel circular cross section tube 12 having a plurality of circumferentially spaced tips 11 at its lower end. The tips are preferably of a diamond impregnated type. It will be noted that the tips 11 define an internal diameter d1 which is less than the internal diameter d2 of the tube 12.

The upper end of the tube 12 is flared outwardly to define a tapered end 13 having an internal tapered surface 14 and an external tapered surface 15.

The internal tapered surface 14 locates on an external tapered surface 16 formed on a rotary driving member 17. The driving member 17 is formed with a screw thread 18 at its upper end as viewed in FIG. 1 for location in a drive spindle of a drilling machine (not shown). The driving member 17 is formed with an internal bore 19 through which a drilling fluid flows to the lower end of the drill bit 10 when the bit is in use.

A first holding member in the form of a first sleeve 20 is formed with an internal screw thread 20a. At one end of the sleeve 20 there is an inwardly directed projection in the form of an annular flange 21. The sleeve 20 is rotatably mounted on the driving member 17 and the flange 21 is held captive between opposed annular surfaces defined by a shoulder 22 on the driving member 17 and a washer 23 held in place by a spring retaining clip 24 which locates in a groove 24a in the driving member 17.

A second holding member in the form of a second sleeve 30 is formed with an external screw thread 30a for threaded engagement with the screw thread 20a of the first sleeve 20. The second sleeve 30 also has an inwardly directed projection in the form of an annular flange 31 at one end thereof defining a radial surface. The flange 31 is arranged to abut against an annular surface defined by a washer 32 which, in the case of the right hand half of FIG. 1, is positioned on the tube section 12 of the drill bit 10 and is held in place by means of a spring retaining clip 33 in a groove 33a, and, in the case of the left hand half of FIG. 1, is a taper frictional fit on the tapered surface 15 of the drill bit 10. The sleeve 30 is rotatably mounted on the drill bit 10.

In order to fit the drill bit 10 into the chuck in frictional driving engagement with the drive member 17, screw threads 20a, 30a of the first and second sleeves 20, 30 are screwed together manually and tightened. By means of abutment between the flange 21 of the first sleeve 20 and the washer 23 of the drive member 17, and abutment between the flange 31 of the second sleeve 30 and the washer 32 of the drill bit 10, the screwing together of the first and second sleeves 20, 30 causes the tapered surface 14 of the drill bit 10 and the tapered surface 16 of the drive member 17 to be urged together.

The angle of taper a of the surfaces 14, 16 is preferably selected to ensure that drive can be transmitted frictionally from the driving member 17 to the drill bit 10 via the surfaces. A suitable angle of taper is slightly greater than 15 degrees, eg 15.5 degrees which will also enable the drill bit 10 to be manually detached from the tapered surface 16 of the driving member 17 after the sleeve 30 has been unscrewed.

In use, the drill bit 10 is driven into the ground so as to generate a core sample. When sufficient depth has been reached, the drill bit 10 is extracted from the ground along with the core sample which is positioned freely within the tube 12. However, the diameter of the core will be approximately the same as the internal diameter d1 defined by the tips 11 and will normally be difficult to remove from the lower end of the drill bit 10. However, with the present invention, it is a simple matter to unscrew the sleeves 20, 30 manually by holding them in both hands to enable the flared upper end of the drill bit 10 to be disconnected from the driving member 17. The drill bit 10 can then be inverted so that the core sample will slide out of the tapered end of the drill bit 10 for retrieval. When rotating the sleeve 30, it is much easier to overcome the friction between the flange 31 and the washer 32 than between two frictionally engaged tapered surfaces as in our UK No. 2263489.

The chuck of FIGS. 2 and 3 includes all of the features of the chuck in FIG. 1. In addition, a washer 34 is restrained on the tube 12 by means of a spring retaining clip 35 in a groove 35a. The flange 31 is held captive between the washers 32, 34 and again, the sleeve 30 can be rotated on the drill bit 10. Accordingly, on unscrewing the sleeves 20, 30 one from the other, the sleeves abut respectively against shoulder 22 of the driving member 17 and washer 35 on the drill bit 10 whereby sufficient unscrewing movement will break the frictional grip between the tapered surfaces 14,16.

By using a system as in FIG. 2 which will give a positive force for breaking apart the two tapered surfaces 14, 16, the taper angle t can be made more shallow than hitherto thereby improving the frictional drive capability between the driving member 17 and the drill bit 10. With a more shallow angle of taper t, eg 15°, the two sleeves 20, 30 do not need to be screwed together as tightly as in FIG. 1 to obtain the same frictional grip between the drill bit 10 and the driving member 17 making it even easier to remove and re-fit the drill bit manually.

The tube 12 may be selected from a range of diameters. By placing the washer 32 at a position axially of the drill bit which is appropriate to the particular diameter, the drill chuck of the present invention is capable of receiving drill bits of a range of diameters. FIGS. 1 and 2 show two alternative positions of the washer 32.

Reference is now made to FIG. 4 in which parts corresponding to parts in FIG. 2 carry the same reference numerals. FIG. 4 shows the way in which the upper end of the tube 12 can be provided with a separate internally tapered tubular section 44 of annular cross section which has a cylindrical bore 45 in which the tube 12 is welded or brazed. The tube 12 has a shoulder 46 thereon which is equivalent to the washer 32 in FIG. 2 and the second sleeve 30 has a snap ring 48 mounted in a groove 50 in the sleeve 30 which provides a radial surface on the sleeve 30 equivalent to that provided by the flange 31 in FIG. 2. The tubular section 44 carries a washer 34 and spring retaining clip 35 in the same manner as the tube 12 in FIG. 2. By using the tubular section 44, it is not necessary to flare the tube 12 outwardly to provide the tapered end 13. However, for large scale production, the use of the flared tube 12 is preferred as it avoids the use of a separate element which needs to be attached to the tube.

It is envisaged that the sleeves 20, 30 may be machined from a suitable plastic material or a metal.

A particular advantage of the present invention is that tools are not required to separate the drill bit 10 from the drive member 17. To assist manual rotation of the sleeves 20, 30 the two sleeves may have knurled outer surfaces 40, 41 which help a user to grip the sleeves one in each hand and twist them to release the drill bit 10.

I claim:

1. A drill chuck for holding a tapered end of a tubular drill bit, the chuck comprising a driving member having a tapered surface for frictional engagement with the tapered end of the tubular drill bit, a first holding member separate from the driving member and mounted on the driving member for movement relative to the driving member, and a second holding member engageable with the tubular drill bit, the second holding member having a substantially radial surface thereon for abutment with a surface on the drill bit, the two holding members being interconnectable by relative rotary movement whereby abutment between the substantially radial surface on the second holding member and the surface on the drill bit urges the tapered end of the tubular drill bit into frictional driving contact with the tapered surface of the driving member.

2. A drill chuck for holding a tapered end of a tubular drill bit, the chuck comprising a driving member having a tapered surface for frictional engagement with the tapered end of the tubular drill bit, a first holding member rotatably mounted on the driving member and a second holding member engageable with the tubular drill bit, the second holding member having a substantially radial surface thereon for abutment with a surface on the drill bit, the two holding members being interconnectable by relative rotary movement whereby abutment between the substantially radial surface on the second holding member and the surface on the drill bit urges the tapered end of the tubular drill bit into frictional driving contact with the tapered surface of the driving member.

3. A drill chuck according to claim 2 in which means is provided for rotatable mounting the second member on the tubular drill bit.

4. A drill chuck according to claim 2 in which one of the first holding member and driving member has a projection thereon for abutment with a surface on the other so that the drill bit and driving member will be drawn towards each other by interconnection of the two holding members, the projection locating in a space between two surfaces on the driving member whereby the first holding member is held captive on the driving member.

5. A drill chuck according to claim 4 in which the projection is provided on the first holding member.

6. A drill chuck according to claim 4 in which the projection locates in a space between two surfaces on the driving member whereby the first holding member is held captive on the driving member.

7. A drill chuck according to claim 2 in which the substantially radial surface on the second holding member is annular.

8. A drill chuck according to claim 7 in which the said surface on the drill bit which, in use, is abutted by the substantially radial surface of the second holding member is annular.

9. A drill chuck according to claim 2 in which the first holding member is a sleeve.

10. A drill chuck according to claim 2 in which the second holding member is a sleeve.

11. A drill chuck according to claim 2 in which the first and second holding members are interconnected by means of a helical surface on one of the holding members and a co-operable surface on the other of the holding members so that the drill bit is drawn against the driving member by a relative rotary movement between the two holding members.

12. A drill chuck according to claim 11 in which the helical surface and co-operable surface are interengageable screw threads on the respective holding members.

13. A drill chuck according to claim 2 in which the drill bit is provided with an abutment surface against which a surface portion of the second holding member can be driven during disconnection of the two holding members so as to separate the tapered surface of the drill bit from the tapered surface of the driving member.

14. A drill chuck including a tubular drill bit, the drill chuck comprising a driving member having a tapered surface for frictional engagement with a tapered end of the drill bit, an abutment surface on the drill bit, and holding means for the drill bit, the holding means being movable into a holding position in which it holds the tapered end of the drill bit in frictional engagement with the tapered driving surface of the driving member and into a release position in which it abuts said abutment surface and separates the tapered end of the drill bit from the tapered surface of the driving member to enable the drill bit to be removed from the chuck.

15. A drill chuck according to claim 14 in which retention means is provided on the drill bit by which a part of the holding means is held captive on the drill bit.

16. A drill chuck according to claim 15 in which the holding means comprise a first holding member mounted on the driving member and a second holding member held captive by said retention means on the drill bit.

17. A drill chuck according to claim 16 in which the second holding member has a substantially radial surface thereon held captive between spaced apart surfaces on the drill bit.

18. A drill chuck according to claim 17 in which one of said spaced apart surfaces is a surface on the drill bit which can be abutted by the substantially radial surface on the second holding member to enable the drill bit to be drawn towards the driving member.

19. A drill chuck according to claim 18 in which the other of said spaced apart surfaces is an abutment surface against which a surface portion of the second holding member can be driven during disconnection of the two holding members so as to separate the tapered surface of the drill bit from the tapered surface of the driving member.

20. A drill chuck for holding a tapered end of a tubular drill bit, the chuck comprising a driving member having a tapered surface for frictional engagement with the tapered end of the tubular drill bit, a first holding member mounted on the driving member and a second holding member engageable with the tubular drill bit, the second holding member having a substantially radial surface thereon for abutment with a surface on the drill bit, the two holding members being interconnectable by relative rotary movement whereby abutment between the substantially radial surface on the second holding member and the surface on the drill bit urges the tapered end of the tubular drill bit into frictional driving contact with the tapered surface of the driving member, a portion of the first holding member being formed to include radially inwardly facing threads, and a portion of the second holding member being formed to include radially outwardly facing threads engaging the radially inwardly facing threads of the portion of the first holding member.

* * * * *